United States Patent [19]
Dieudonne et al.

[11] Patent Number: 5,712,854
[45] Date of Patent: Jan. 27, 1998

[54] METHOD OF ROUTING CELLS IN AN ASYNCHRONOUS TIME-DIVISION MULTIPLEX SWITCHING NETWORK AND CORRESPONDING NETWORK INPUT SWITCH AND APPLICATION

[75] Inventors: Marc Dieudonne, Igny; Patrick Frene, Malakoff; Pierre Parmentier, Saclay, all of France

[73] Assignee: Alcatel Cit, Paris, France

[21] Appl. No.: 565,105

[22] Filed: Nov. 30, 1995

[30] Foreign Application Priority Data

Dec. 1, 1994 [FR] France ................... 94 14 451

[51] Int. Cl.⁶ ............................................. H04L 12/56
[52] U.S. Cl. ........................... 370/536; 370/394; 370/399
[58] Field of Search ........................ 370/219, 220, 370/395, 398, 399, 422, 427, 536, 411, 394; 371/8.1, 8.2, 30, 37.7, 48, 49.1

[56] References Cited

U.S. PATENT DOCUMENTS

| | | | |
|---|---|---|---|
| H1175 | 4/1993 | Georgio | 370/536 |
| 4,383,316 | 5/1983 | Seidel | 370/536 |
| 5,216,668 | 6/1993 | Zhang | 370/411 |
| 5,268,909 | 12/1993 | Loebig | 371/49.1 |
| 5,285,444 | 2/1994 | Sakurai et al. | 370/395 |
| 5,355,372 | 10/1994 | Sengupta et al. | 370/367 |
| 5,436,886 | 7/1995 | McGill | 370/219 |
| 5,588,003 | 12/1996 | Ohba et al. | 370/536 |

FOREIGN PATENT DOCUMENTS

0529283A1  3/1993  European Pat. Off. .

OTHER PUBLICATIONS

P. Newman et al, "A Fast Packet Switch for the Integrated Services Backbone Network", *IEEE Journal on Selected Areas in Telecommunications*, vol. 6, No. 9, Dec. 1988 USA, pp. 1468–1479.

*Primary Examiner*—Hassan Kizou
*Attorney, Agent, or Firm*—Sughrue, Mion, Zinn, Macpeak & Seas, PLLC

[57] ABSTRACT

In a method of routing cells in an asynchronous time-division multiplex switching network interconnecting input switches and output switches via switches, each input switch can be connected to each output switch via at least two paths. The transmission of a sequence of cells of a given call between one input switch, called the call input switch, and one output switch, called the call output switch, comprises the following steps:

- determining the set of N possible paths between the call input switch and the call output switch,
- setting up N sub-connections corresponding to the N possible paths,
- in the call input switch, systematically and equitably distributing the cells of the sequence to the N sub-connections, and
- in the call output switch, assembling the cells of the sequence to reconstitute the sequence.

7 Claims, 4 Drawing Sheets

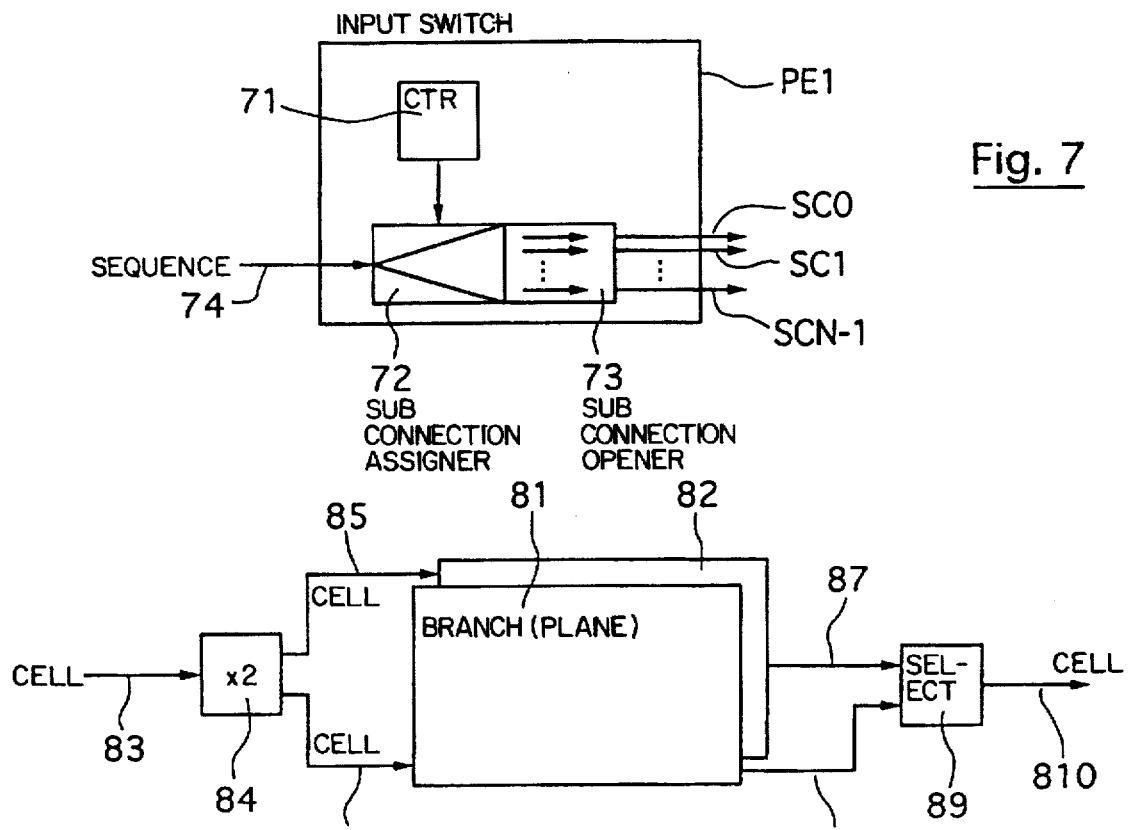
Fig. 7
Fig. 8
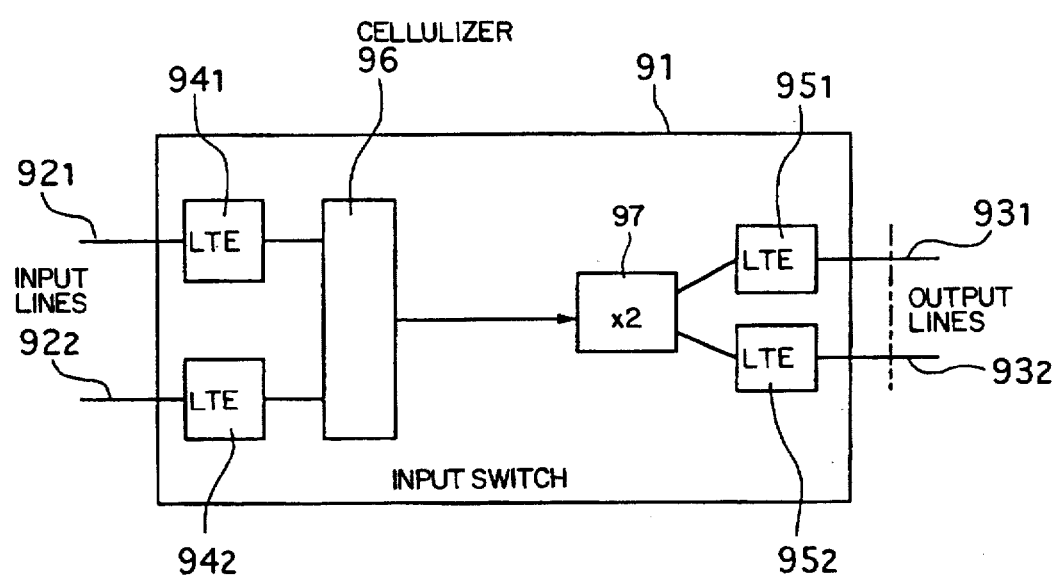
Fig. 9

METHOD OF ROUTING CELLS IN AN ASYNCHRONOUS TIME-DIVISION MULTIPLEX SWITCHING NETWORK AND CORRESPONDING NETWORK INPUT SWITCH AND APPLICATION

BACKGROUND OF THE INVENTION

1. Field of the invention

The field of the invention is that of asynchronous time-division multiplex switching networks, in particular networks supporting Asynchronous Transfer Mode (ATM) cell traffic.

To be more precise, the invention concerns the routing of cells in an asynchronous time-division multiplex switching network of this kind.

2. Description of the prior art

A switching network connects input switches and output switches via switches. It must be possible to transmit a series of cells of a given call between any of the input switches and any of the output switches.

In a network of this kind each input switch can be connected to each output switch via at least two different paths, each path corresponding to a different sequence of switches. Each switch has at least two inputs and at least two outputs and is adapted to transfer to one of its outputs a cell received at one of its inputs.

There are two main prior art methods of routing cells in an asynchronous time-division multiplex switching network.

The first prior art method entails defining a single path for the sequence of cells to be transmitted that belong to a given call. Accordingly, after a call set-up phase (during which the path is determined), all the cells travel in succession over that single path.

This first prior art routing mode has the advantage of requiring a search for (and then use of) only one path. However, problems can arise in searching for the single path. During the call set-up phase, it is possible that no path is found even though the switching network is not saturated. This "blocking" situation (to use that term in a wide sense), therefore corresponds to the situation in which, although an input switch and an output switch are available, the routing mode selected is such that there is no sequence of switches able to interconnect them. In the narrow sense of the term, a "blocking" situation is one in which there is no possible path between an input switch and an output switch, regardless of the routing mode adopted.

A prior art solution to the problem of avoiding this kind of "blocking", in the wide sense, is to implement spatial expansion (by increasing the number of switches in the network and/or by increasing the bit rate), which increases the cost and the complexity of the network. Another prior art solution is to rearrange the paths associated with calls already set up to make some switches available so that a path can be set up. This rearrangement of paths is a complex operation and may be impossible if there is more than one blockage at a time.

The second prior art routing mode transmits the cells of a given series belonging to a given call in a decorrelated manner. In other words, the successive cells of the same sequence follow different paths (this mode is sometimes known as the multipath mode). The assignment of a path to a cell is generally effected in accordance with a random distribution. There can be any number of different paths, and this number is usually limited to the minimal number needed.

This results in a better distribution of the cells across the network, and reduces the risk of blocking. However, the second routing mode is complex because of the use of a random distribution of cells to the various paths. Also, bias occurs in practise and the cells tend to follow paths that are somewhat similar, which again leads to blocking (in the wide sense) even though the network is not saturated. The reasons for blocking include congestion of the buffer memories in the switches.

To avoid congestion, multipath networks usually include a cell cross-connect stage. Unfortunately, a stage of this kind offers no control over differences between bit rates incoming to the various input switches.

One objective of the invention is to alleviate these various drawbacks of the prior art.

To be more precise, one objective of the present invention is to provide a method of routing cells in an asynchronous time-division multiplex switching network which renders the network non-blocking (in the wide sense) without requiring any spatial expansion (increase in the number of matrices) or bit rate expansion of the network provided that the latter is not saturated. In other words, one objective of the invention is to avoid congestion of switch buffer memories.

Another objective of the invention is to provide a routing method of this kind that does not necessitate complex random distribution of the cells to the various paths.

SUMMARY OF THE INVENTION

These various objectives, and others that emerge below, are obtained in accordance with the invention by means of a method of routing cells in an asynchronous time-division multiplex switching network interconnecting input switches and output switches via switches,

- each of said input switches being adapted to be connected to each of said output switches via at least two paths, each path corresponding to a different sequence of switches,
- each of said switches having at least two inputs and at least two outputs and being adapted to transfer to one of its outputs a cell received at one of its inputs,
- wherein the transmission of a sequence of cells of a given call between one of said input switches, hereinafter referred to as the call input switch, and one of said output switches, hereinafter referred to as the call output switch, comprises the following steps:
  - determining the set of N possible paths between said call input switch and said call output switch,
  - setting up N sub-connections corresponding to said N possible paths,
  - in said call input switch, systematically and equitably distributing the cells of said sequence to said N sub-connections, and
  - in said call output switch, assembling the cells of said sequence to reconstitute said sequence.

Thus, for each sequence of cells to be transmitted, the routing method of the invention determines all possible paths, sets up a sub-connection for each possible path and assigns one of the sub-connections to each cell systematically and turn and turn about. In this way, each of the N sub-connections outgoing from an input switch for a given call carries 1/N of the traffic arriving at that input switch.

The distribution of the cells to the sub-connections being systematic, it is very simple to implement at low cost (unlike a random distribution, as used in the second prior art routing mode discussed above).

Said distribution is advantageously cyclic.

Thus the invention proposes a new and deterministic approach radically different from the prior art random method.

The distribution of the invention also ensures an equitable distribution of the traffic across the network, which limits the risk of congestion of the switch buffer memories and so renders the network non-blocking (in the wide sense).

In one advantageous embodiment of the invention, applied to a network in which each of said input switches is associated with a switch belonging to a first stage, each of said output switches is associated with a switch belonging to a final stage, the switches of said first and final stages being interconnected by at least two switches forming at least one intermediate stage, the number of possible paths corresponding to the number of switches assigned to cell transfer and belonging to said intermediate stage or to the product of the numbers of switches assigned to cell transfer and belonging to each of said intermediate stages.

Note that in the simplest case, the central stage constitutes the single intermediate stage.

It can be shown that the routing method of the invention halves the number of switches per port as compared to the solution with no blocking in the narrow sense of this term.

Each of said switches is advantageously duplicated, to ensure double transmission in parallel of each of said cells.

In this case, on reception, the cells received in parallel are compared.

Thus the network is duplicated into two branches (or planes), each branch being an asynchronous time-division multiplex switching network, which offers good tolerance to faults and transmission errors.

Preferably, each of said cells is assigned error detection and/or correction data and, on reception, the quality of the cells received in parallel is verified and those which have the best quality are retained to reconstitute said sequence.

Thus two cells of the same sub-connection that have travelled via two different branches are compared and that which appears to be less affected by errors, possibly after correction, is selected.

This makes the network able to resist multiple errors or failures, up to the point at which a matrix in one branch and its double in the other branch fail simultaneously.

Further, locating a faulty matrix in one branch is facilitated by knowing the path taken by a disturbed cell that has passed through the faulty matrix.

The invention also concerns a switching network implementing the method defined above. In a network of this kind, each of said input switches advantageously comprises:

- means for opening N sub-connections corresponding to the N possible paths between said call input switch and said call output switch;
- means for assigning one of said sub-connections to each cell of said sequence so that the cells of said sequence are distributed in a systematic and equitable fashion to said N sub-connections.

Advantageously, each of said input switches also comprises a modulo N counter incremented for each new cell to be transmitted of said sequence, said assignment means assigning one of said sub-connections to each cell of said sequence according to the value written in said counter.

The invention also concerns the input switch as such of a network of the type defined above, and applications of the method defined above.

Other features and advantages of the invention will emerge from a reading of the following description of a preferred embodiment of the invention given by way of non-limiting illustrative example only and from the appended drawings.

BRIEF DESCRIPTION OF THE DRAWINGS

FIG. 7 is a diagram showing one specific embodiment of an input switch from the network shown in FIG. 1.

FIG. 8 shows one specific embodiment of the cell routing method of the invention, for the situation in which each switch of the network is duplicated.

FIG. 9 is a diagram showing one specific embodiment of a network input switch of the invention, of the type receiving data frames and injecting data cells into the intermediate stages of the network.

DETAILED DESCRIPTION OF THE PREFERRED EMBODIMENT

The invention concerns a method of routing cells in an asynchronous time-division multiplex switching network.

In the Asynchronous Transfer Mode (ATM), the cells which constitute the units of data have a fixed and short structure and are sequenced with no absolute position reference. The communication channel identification is carried by the cell itself, in a header. Consequently, a source can output cells at its own rate, with no direct reference to the switching network to which it is connected.

Figure 1:
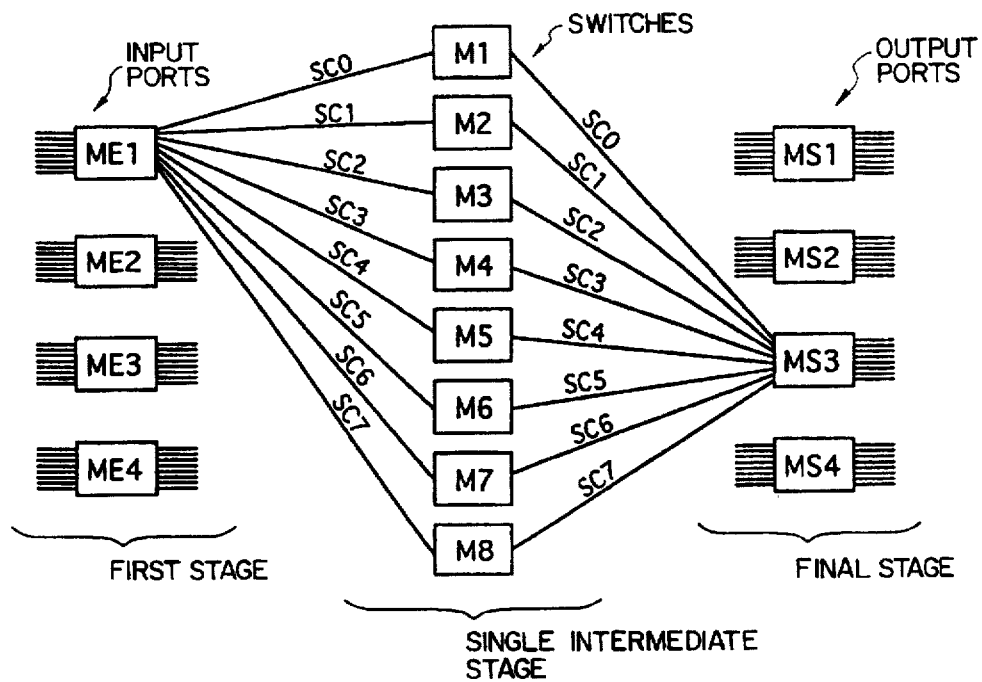
FIG. 1 shows the method in accordance with the invention for routing cells in one specific embodiment of a switching network.

FIG. 1 is a diagram showing one example of a switching network in which the cell routing method of the invention can be applied. This network interconnects input ports ME1 through ME4 and output ports MS1 through MS4 through intermediate switches M1 through M8. Hereinafter, said ports are treated as switches or matrices. Each associated input switch ME1 through ME4 can be connected to each of the associated output switches MS1 through MS4 by at least two paths, each path corresponding to a different sequence of switches M1 through M8.

In the FIG. 1 example, a sequence of switches defining a path is in fact a single one of the switches M1 through Each intermediate switch M1 through M8 has at least two inputs and at least two outputs and is adapted to transfer to one of its outputs a cell received at one of its inputs.

To simplify FIG. 1, the meshing of the network is not shown, i.e. the set of permanent links between the outputs of the input switches ME1 through ME4 and the inputs of the intermediate switches M1 through M8 and between the outputs of the intermediate switches M1 through M8 and the inputs of the output switches MS1 through MS4.

To transmit a sequence of cells of a given call between one of the input switches and one of the output switches, the routing method of the invention comprises the following steps:

determination of all the N possible paths between the input switch and the output switch;

setting up of N sub-connections corresponding to the N possible paths;

systematic and cyclic distribution of the cells to the N sub-connections so that N consecutive cells each follow a different path.

A sub-connection is a virtual path to which certain cells of the same call are directed in accordance with a systematic and cyclic distribution. The sub-connection is usually defined only for the duration of the call.

Referring to FIG. 1, consider by way of example the situation in which a sequence of cells is to be transmitted between the input switch ME1 and the output switch MS3. The step which determines all possible paths determines eight possible paths between ME1 and MS3, each path corresponding to one of the eight intermediate switches M1 through M8. The next step is to establish eight sub-connections SC0 through SC7 corresponding to the eight possible paths. The final step of distributing the cells to these sub-connections is shown in FIG. 2.

Figure 2:
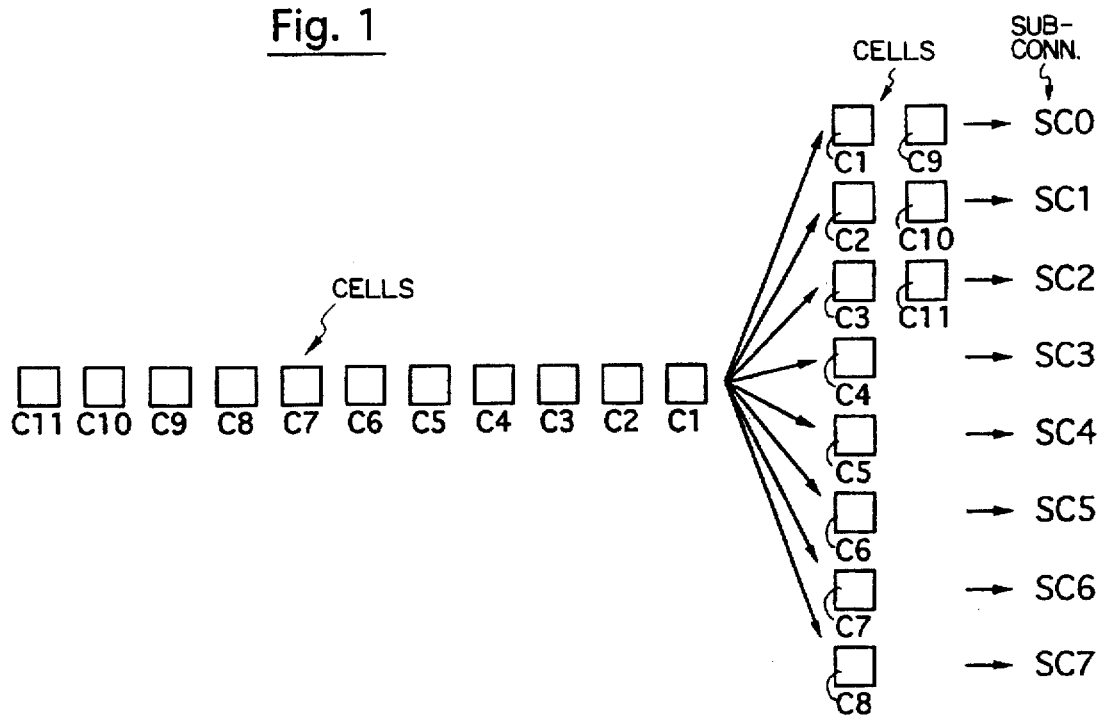
FIG. 2 shows one example of the systematic and cyclic distribution of cells to sub-connections of the network from FIG. 1.

FIG. 2 shows the result of the systematic and cyclic distribution of a sequence of 11 consecutive cells C1 through C11 to the eight sub-connections SC0 through SC7. Each of the first eight cells C1 through C8 is directed to one of the eight sub-connections SC0 through SC7, after which each of the remaining cells is directed to one of the first three sub-connections SC0 through SC2.

Accordingly, in this example, the first sub-connection SC0 receives the cells C1 and C9, the second sub-connection SC1 receives the cells C2 and C10, the third sub-connection SC2 receives the cells C3 and C11, and so on. In other words, each sub-connection receives all the cells which, modulo N, have the same numeric position in the sequence, where N is the total number of sub-connections set-up.

In one particular embodiment, each input switch ME1 through ME4 is associated with a switch belonging to a first stage, each output switch is associated with a switch belonging to a final stage, and these switches of the first and final stages are interconnected by means of at least two switches forming at least one intermediate stage.

In this case, the number N of possible paths between an input switch and an output switch depends on the number of switches belonging to the intermediate stage(s) that are assigned to cell transfer.

To be more precise, if there is a single intermediate stage comprising k switches assigned to cell transfer, the number N of possible paths is equal to k (N=k).

If there are n intermediate stages respectively comprising $k_1$ through $k_n$ switches assigned to cell transfer, the number N of possible paths is equal to the product of the numbers $k_1$ through $k_n$ of switches in the intermediate stages (N=$k_1$× $k_2$× . . . ×$k_n$).

Figure 3:
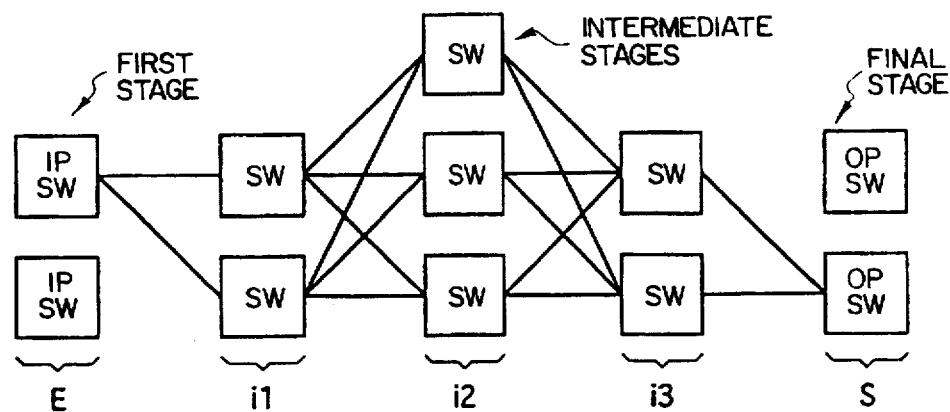
FIG. 3 shows the method in accordance with the invention of routing cells in another specific embodiment of a switching network with three intermediate stages.

FIG. 3 shows a network comprising a first stage E, a final stage S and three intermediate stages i1 through i3 respectively comprising two, three and two switches. There are therefore N=2×3×2=12 possible paths between an input switch of the first stage E and an output switch of the final stage S.

Figure 4:
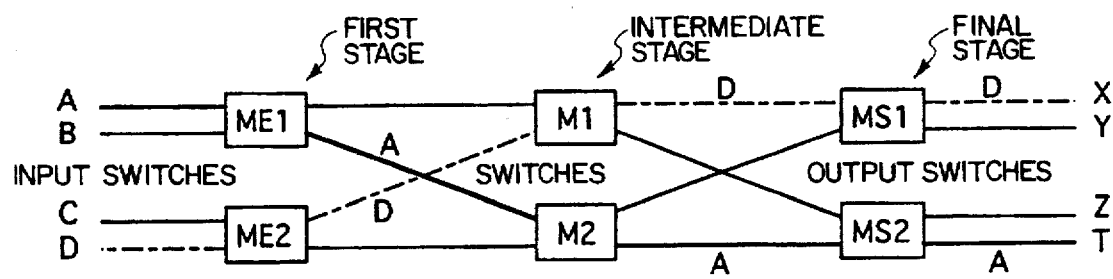
FIG. 4 shows one example of blocking point-to-point connections in a network using a prior art routing method.
Figure 5:
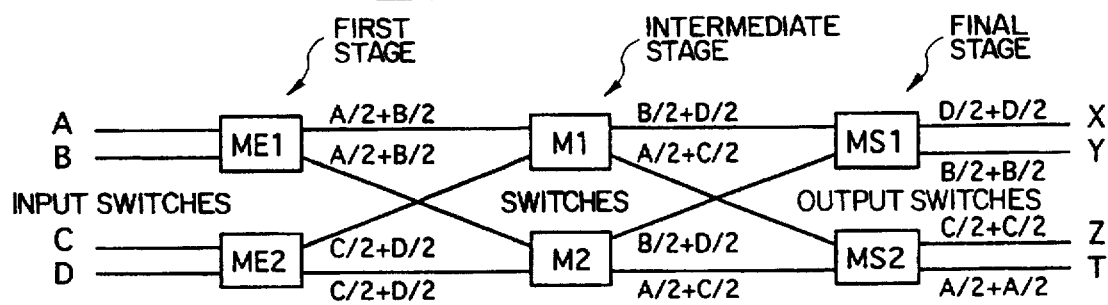
FIG. 5 shows one example of non-blocking point-to-point connections in a network of the type shown in FIG. 4 but using the routing method of the invention.
Figure 6:
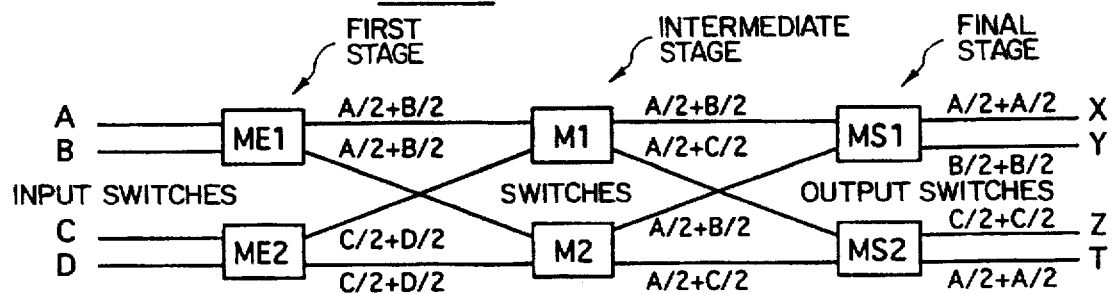
FIG. 6 shows an example of non-blocking point-to-multipoint and point-to-point connections in a network of the type shown in FIG. 4 but using the routing method of the invention.

To show clearly the blocking reduction capabilities of the routing method of the invention, there is next described, purely by way of example, a network which is a blocking network if it uses a prior art routing method (cf FIG. 4) and a non-blocking network if it uses the routing method of the invention (cf FIGS. 5 and 6).

The network shown in FIGS. 4 through 6 comprises:

a first stage comprising two input switches ME1, ME2, an intermediate stage comprising two switches M1, M2, and a final stage comprising two output switches MS1, MS2.

Each input switch ME1, ME2 has two inputs A, B and C, D, respectively, and two outputs. Each of the two outputs of an input switch ME1, ME2 is connected to an input of each of the two switches M1, M2. Each of the two outputs of the switch M1, M2 is connected to an input of each of the two output switches MS1, MS2. Each output switch MS1, MS2 has two outputs X, Y and Z, T, respectively.

Consider first the specific case of uni-directional point-to-point connections (cf FIGS. 4 and 5).

With a conventional routing method, the transmission of a sequence of cells of a given call between an input of an input switch and an output of an output switch comprises the following steps:

determination of a possible path, and setting up of a connection corresponding to that possible path.

As shown in FIG. 4, it is sometimes impossible to set up four simultaneous point-to-point connections. In particular, blocking occurs if it is necessary to connect the inputs A, B, C, D to the outputs T, Y, Z, X respectively. As soon as the inputs A and D are connected to the outputs T and X, the inputs B and C can only be connected to the outputs Z and Y, respectively (and under no circumstances to the outputs Y and Z, respectively).

With the routing method of the invention, as shown in FIG. 5, this blocking is avoided. For each call incoming on an input A, B, C, D of the input switch ME1, ME2, as many sub-connections are set up as there are switches M1, M2 in the single intermediate stage (i.e. two sub-connections in this example). The traffic arriving at each input A, B, C, D is distributed across a plurality of (two, in this example) sub-connections, the cells incoming at an input being distributed systematically and cyclically to the various sub-connections corresponding to the various paths.

The reference letter shown in FIGS. 4 through 6 near each of the links between an input switch ME1, ME2 output and a switch M1, M2 input and each of the links between a switch M1, M2 output and an output switch MS1, MS2 input, makes it possible to follow a path from any input switch ME1, ME2 input A, B, C, D.

As can be seen in FIG. 4, there is a single path ME1-M2-MS2 between the input A and the output T. Likewise, there is a single path ME2-M1-MS1 between the input D and the output X.

On the other hand, as can be seen in FIG. 5, there are two different paths ME1-M1-MS2 and ME1-M2-MS2 between the input A and the output T. Likewise, there are two different paths ME2-M1-MS1 and ME2-M2-MS1 between the input D and the output X.

If there are two different paths to which there correspond two different sub-connections, the cells follow each of the two sub-connections alternately. In other words, each sub-connection carries half of the initial traffic and the same link can therefore support two sub-connections to transmit cells belonging to two different calls. In the example shown in FIG. 5, the link between the input switch ME1 and the switch M1 supports a sub-connection connecting the input A to the output T and a sub-connection connecting the input B to the output Y.

There are therefore:

two different paths ME1-M1-MS1 and ME1-M2-MS1 between the input B and the output Y, and two different paths ME2-M1-MS2 and ME2-M2-MS2 between the input C and the output Z.

Consider next the specific case of point-to-multipoint connections, as shown in FIG. 6.

Note first of all that with a conventional routing method it is on occasion impossible to set up four simultaneous connections at least one of which is a point-to-multipoint connection. With the FIG. 4 network, it is impossible to connect the input A to the outputs X and T (point-to-multipoint connection) and the inputs B and C to the outputs X and Y, respectively (point-to-point connections). As soon as the input A is connected to the inputs X and T, the inputs B and C can no longer be connected to any output.

Once again, using the routing method of the invention this blocking is avoided. To achieve this, there are two different paths ME1-M1-MS1 and ME1-M2-MS1 between the input A and the output X and two different paths ME1-M1-MS2 and ME1-M2-MS2 between the input A and the output T.

The sequences of cells incoming at the input A and corresponding to two different calls are assigned to these two pairs of paths systematically and cyclically. This defines:

two different paths ME1-M1-MS1 and ME1-M2-MS1 between the input B and the output Y, and two different paths ME2-M1-MS2 and ME2-M2-MS2 between the input C and the output Z.

FIG. 7 is a diagram showing one specific embodiment of an input switch ME1 through ME4 of the FIG. 1 network. To implement the routing method of the invention, each input switch receiving a sequence 74 of cells to be transmitted comprises:

means 73 for opening N sub-connections SC0 through SCN-1 between this input switch and an output switch, N being the number of possible paths between the input and output switches, a modulo N counter 71 incremented for each new cell to be transmitted of the sequence 74, and means 72 for assigning one of the sub-connections SC0 through SCN-1 to each cell to be transmitted according to the value written in the counter 71. Thus N consecutive cells each take a different path corresponding to a different sub-connection.

In one particular embodiment of the invention, as shown in FIG. 8, each of the switches is duplicated and the network comprises two identical branches (or planes) 81, 82. Each cell 83 to be transmitted is also duplicated (84), the two cells 85, 86 obtained being transmitted in parallel in the two planes 81, 82. At the receiving end, after comparison, one cell 810 is selected (89) from the two cells 87, 88 received.

Each cell 83 to be transmitted can be assigned error detection and/or correction data, for example a CRC byte. Thus if the cells 87, 88 received in parallel are different, the more probable cell 810 is selected (89) according to the error detection and/or correction data.

Figure 10:
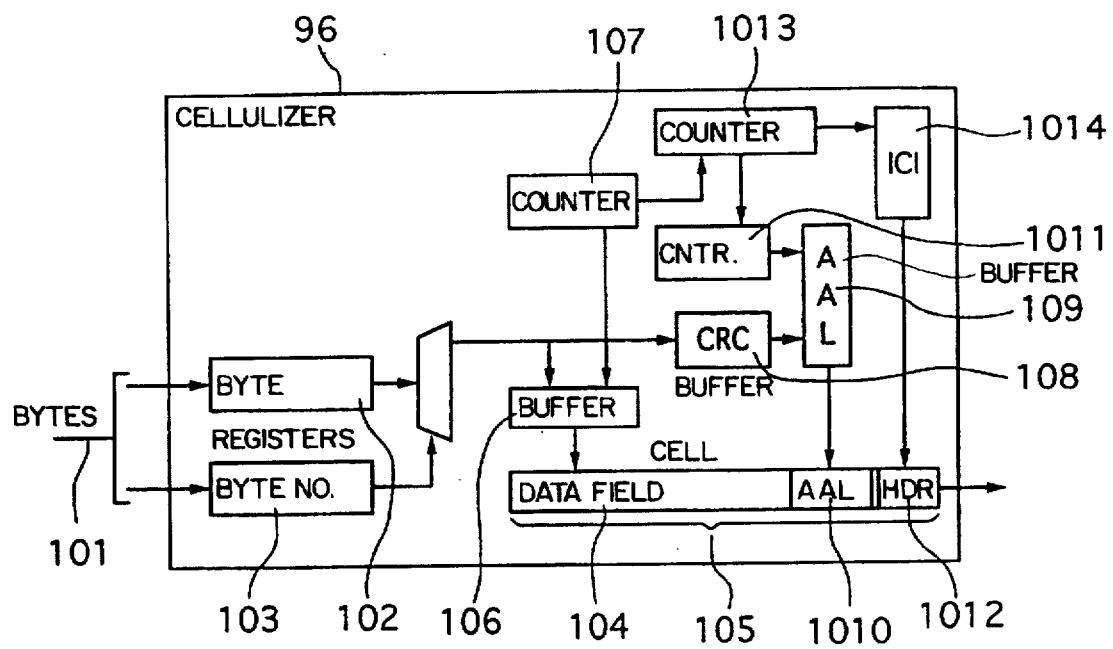
FIG. 10 is a diagram showing one specific embodiment of a cellulizer included in the input switch from FIG. 9.
Figure 11:
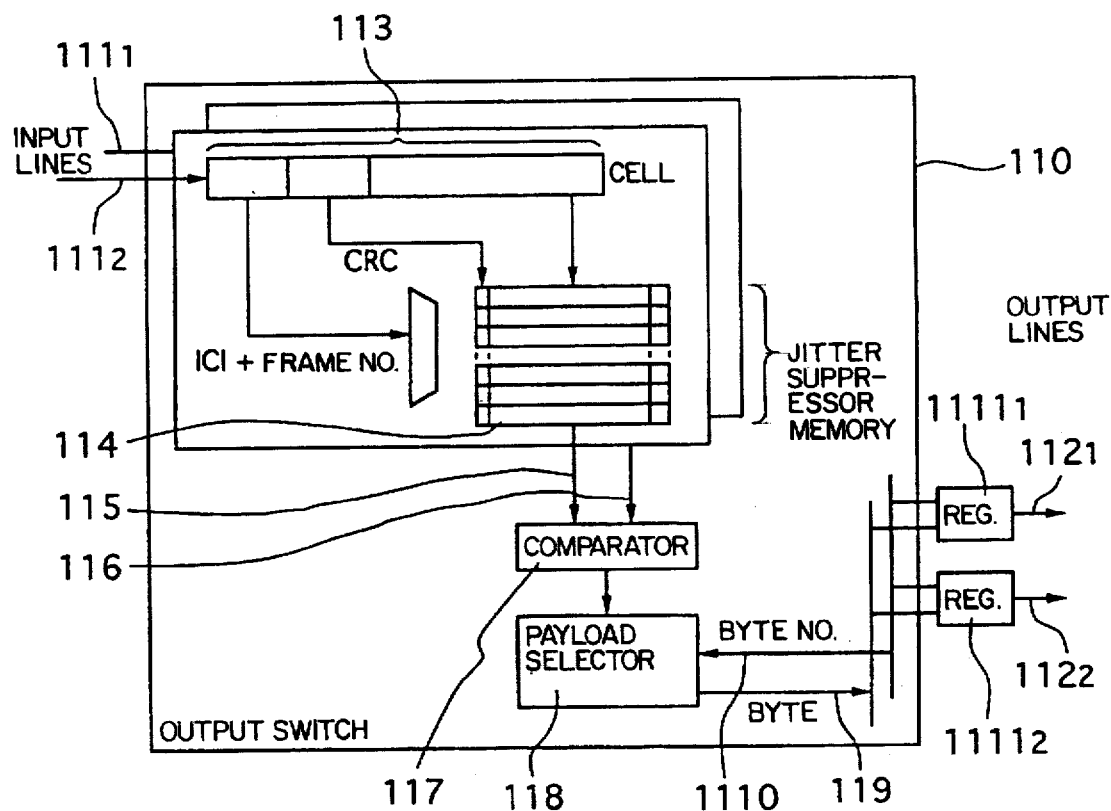
FIG. 11 is a diagram showing one specific embodiment of an output switch of the network of the invention, of the type generating data frames from data cells received from intermediate stages of the network.

The remainder of the description explains one very specific embodiment of the invention with reference to FIGS. 9 through 11; in this embodiment the network input switches implement a cellulization function and the network output switches implement a de-cellulization function. In this very specific example, the input switches of the network receive frames of bytes and the output switches of the network generate frames of bytes. In other words, the input switches convert from a synchronous transmission mode to an asynchronous transmission mode and the output switches carry out the opposite conversion.

It is evident that the invention is not limited to this highly specific embodiment, but concerns more generally all situations in which cells (asynchronous mode) are routed between input switches and output switches, regardless of the data transmission mode (synchronous or asynchronous) on the upstream side of the input switches and on the downstream side of the output switches.

FIG. 9 is a diagram of one specific embodiment of an input switch 91 of the invention, of the type receiving data frames on input lines $92_1$ through $92_2$ and generating data cells on output lines $93_1$ through $93_2$.

The input lines $92_1$, $92_2$ are 155.52 Mbit/s synchronous lines carrying STM1 type frames, for example. The output lines $93_1$, $93_2$ are 622 Mbit/s asynchronous lines, for example, each corresponding to a port to one of the two branches of an ATM network, as explained below.

A respective line termination equipment $94_1$, $94_2$, $95_1$, $95_2$ corresponds to each input line $92_1$, $92_2$ and each output line $93_1$, $93_2$.

The STM1 frames received on the input lines $92_1$, $92_2$ are converted into data cells in a cellulizer 96 (described below with reference to FIG. 10). Each cell output by the cellulizer 96 is duplicated in a duplicator module 97 (a QRP device operating in IEM mode, for example) and the two cells obtained in this way are each directed to one of the two output lines $93_1$, $93_2$.

The routing method used in this specific embodiment of the invention is therefore of the type described above with reference to FIG. 8. For each sequence of cells generated by the cellulizer, two identical cell sequences are transmitted in two parallel "planes" each of which constitutes an asynchronous time-division multiplex switching network implementing the routing method of the invention, in particular by setting up N sub-connections corresponding to the N possible paths and systematically and cyclically distributing the cells to these N sub-connections.

FIG. 10 is a diagram showing one particular embodiment of the cellulizer 96 included in the input switch 91 from FIG. 9.

In the input switch 91, a cellulizer 96 is associated with each input line $92_1$, $92_2$. Following synchronization of incoming frames, the cellulizer receives a succession 101 of bytes.

Two registers 102, 103 receive each —a byte succession and its corresponding number in the frame.

Each byte is stored temporarily in a buffer register 106 of the data field, according to the value written into the modulo C1 counter 107, where C1 is equal to the number of bytes in the data field 104 (C1=46 in this example), the counter 107 being incremented (by a local clock) as each new byte is written.

When the buffer register 106 is full it is copied into the data field 104 of a cell 105.

The C1 bytes intended for the same cell are also used to calculate error detection and/or correction data CRC which is stored in a buffer register 108 and then written together with the frame number into an ATM adaptation layer (AAL) buffer register 109.

The content of this buffer register 109 is copied into an AAL field 1010 of each cell 105. The frame number being supplied by the value written in a modulo C2 counter 1011, where C2 =17, the total number of possible frame numbers, the counter 1011 being incremented by a frame synchronization signal indicating each new frame received.

Finally, a module 1014 supplies for the header field 1012 of each cell 105 an internal connection identifier ICI=x; d for identifying:
- locally, at the switching network port, the group E of sub-connections to which the cell 105 will be directed, and
- the sub-connection (from those of the group X) that the cell 105 will take.

In each group x there are d different sub-connections to which the successive cells of a given sequence (for example: associated with a given call) are distributed systematically and cyclically.

The value d is supplied by the value written into a modulo C3 counter 1013, where C3=N, the number of possible paths between the input switch and the output switch to be interconnected.

Each cell output to one of the output lines $93_1$, $93_2$ of the input switch 91 therefore comprises:
- an interface indication specifying the plane of the network through which it is passed,
- an internal connection identifier ICI=x; d,
- a sequence number (comprising a frame number and a CRC) needed at the receiving end to suppress jitter and to resequence the data, and
- a payload field.

FIG. 11 is a diagram showing one embodiment of an output switch 110 of the network of the invention, of the type generating data frames on output lines $112_1$, $112_2$ from sequences of data cells received from input lines $111_1$, $111_2$.

The output line $112_1$, $112_2$ is a 155.52 Mbit/s synchronous line carrying STM1 type frames, for example.

Each cell 113 received on an input line $111_1$ is stored temporarily in a buffer register. Depending on the ICI and the frame number, the payload field and the CRC are written into the jitter suppressor memory 114 associated with the input link $111_1$.

Likewise, in parallel, the payload field and the CRC of the corresponding cell received on the other input line $111_2$ are stored in the jitter suppressor memory associated with the other input line $111_2$.

Jitter suppression is effected in each memory by reserving one place per expected cell. This achieves resequencing automatically and missing cells are detected immediately.

To form frames on the output lines $112_1$, $112_2$, for each successive cell address (ICI and frame number), each of the two jitter suppressor memories is read. The read cell information 115, 116 is compared (117)—using the CRC in particular—and a payload field is selected (118) from the two that have been read. The bytes 119 of the selected field are written (1110), in accordance with their number, into the frame registers $1111_1$, $1111_2$ which are then read to send the frames to the output lines $121_1$, $112_2$.

The invention can be used in:
- level 4 digital distribution frames (140 Mbit/s, 155 Mbit/s),
- the ATM network of the RCH OCB283 (digital distribution frame cross-connecting:
  - .level 4 (140 Mbit/s, 155 Mbit/s),
  - .level 3 (34 Mbit/s),
  - .level 1 (2 Mbit/s), and
- the networks used in the central spatial switching stage of a 4×3×1 cross-connect unit.

There is claimed:

1. A method of routing cells in an asynchronous time-division multiplex switching network, said network interconnecting input switches and output switches via switches,
- each of said input switches being adapted to be connected to each of said output switches via at least two paths, each of said paths corresponding to a different series of said switches,
- each of said switches having at least two inputs and at least two outputs and each of said switches being adapted to transfer to one of its outputs a cell received at one of its inputs,
- wherein said method of routing being a transmission of a sequence of cells of a given call between one of said input switches, hereinafter referred to as a call input switch, and one of said output switches, hereinafter referred to as a call output switch, comprises the following steps:
  - determining a set of all N possible paths between said call input switch and said call output switch,
  - setting up N sub-connections corresponding to said N paths,
  - in said call input switch, systematically and equitably distributing the cells of said sequence to said N sub-connections, and
  - in said call output switch, assembling the cells of aid sequence to reconstitute said sequence.

2. A method according claim 1 wherein said equitable and systematic distribution is cyclic.

3. A Method according to claim 1 wherein said network comprises two sub-networks in parallel, said network being adapted to effect double transmission in parallel of each cell of said sequence wherein, on reception of the cells, the quality of the cells receive in parallel is verified and wherein those cells having the best quality are retained to reconstitue said sequence.

4. A method according to claim 3 wherein error detection and/or correction data is assigned to each of said cells and, if said cells received in parallel are different, the most probable cell is selected on the basis of said error detection and/or correction data.

5. A method according to claim 1, wherein in said determining step, N corresponds to the product $k_1 \times k_2 \ldots \times k_n$, where $k_1, k_2 \ldots$ and $k_n$ is the number of said switches in an intermediate stage 1, an intermediate stage 2, . . . and an intermediate stage n, respectively, n being the number of intermediate stages, where n>1, wherein each of said input switches belongs to a first stage, each of said output switches belongs to a final stage, the switches of said first and final stages being interconnected by at least two switches forming said intermediate stages.

6. An asynchronous time-division multiplex switching network for routing cells, said network interconnecting input switches and output switches via switches,
- each of said input switches being adapted to be connected to each of said output switches by at least two paths, each path corresponding to a different series of said switches,
- each of said switches having at least two inputs and at least two outputs and each of said switches being adapted to transfer a cell received at one of its inputs to one of its outputs,
- wherein each of said input switches, hereinafter referred to as call input switches, when used to transmit a sequence of cells of a given call to one of said output switches, hereinafter referred to as a call output switch, comprises:
  - means for opening N sub-connections corresponding to a set of all N possible paths between said call input switch and said call output switch, and means for assigning one of said sub-connections to each cell of said sequence so that said cells of said sequence are distributed in a systematic and equitable fashion to said N sub-connections.

7. A network according to claims 6 wherein each of said input switches further comprises a modulo N counter incremented for each new cell to be transmitted of said sequence, said assignment means assigning one of said sub-connections to each cell of said sequence according to a value written in said counter.

* * * * *